Patented July 10, 1951

2,560,044

UNITED STATES PATENT OFFICE 2,560,044

HALO-ALKYLPHENOL STABILIZERS FOR SYNTHETIC RUBBER

Harry E. Albert, Akron, Ohio, assignor to The Firestone Tire & Rubber Company, Akron, Ohio, a corporation of Ohio No Drawing. Application May 10, 1950, Serial No. 161,270

10 Claims. (Cl. 260—45.95)

This invention relates to the use of halo-alkylphenols as stabilizers in synthetic rubbers. The invention includes uncured and cured synthetic rubber which contains the stabilizers, as well as the process of stabilization.

The synthetic rubbers which may be stabilized by these compounds include the rubbery copolymers of hydrocarbon conjugated-diene monomers and mono-unsaturated vinyl-aromatic monomers. The conjugated-diene monomers include, for example, 1,3-butadiene, isoprene, cyclopentadiene, piperylene, dimethylbutadiene, 2-methylpentadiene-1,3, etc. The vinyl-aromatic monomers include, for example, styrene, alphamethyl styrene, nuclear-substituted styrenes, monochlorostyrene, dichlorostyrene, vinylnaphthalene, vinylbiphenyl, vinylcarbazole, etc. The copolymers may include two or more such conjugated-diene monomers or two or more such vinyl aromatic monomers. The invention will be further described in connection with the stabilization of the rubbery copolymer of 1,3-butadiene and styrene more generally known as GR-S.

The stabilizers of this invention are halo-alkylphenols. The unalkylated halogenated phenols and the halogenated phenols which are alkylated with one or more short-chain substituents are quite volatile. They cannot be used satisfactorily as stabilizers in copolymer rubbers. The stabilizers of this invention are halo-alkylphenols which contain halogen in one ortho or para position and one or more alkyl substituents in which the carbon atoms total at least five and may add to about twenty, and include at least one substituent of four to eight carbon atoms. Ordinarily the stabilizer will contain a single halogen atom but experiments with compounds containing two or more halogen atoms have given satisfactory results. Thus, the stabilizers of this invention include, for example:

2-chloro-4,6-di-tert-butylphenol
2-chloro-4-tert-octylphenol
2-tert-octyl-4-chlorophenol
2-chloro-3-methyl-4,6-di-tert-butylphenol
2-chloro-3-methyl-4-butylphenol
2-chloro-3-methyl-4-tert-octylphenol
2,6-di-tert-butyl-4-chlorophenol
2-chloro-4,6-di-sec-amylphenol
2-bromo-4,6-di-tert-amylphenol
2-bromo-4-methyl-6-tert-butylphenol
2-tert-octyl-4-bromophenol
2-iodo-3-methyl-4-tert-octylphenol
2-iodo-3-methyl-4-tert-butylphenol
2-iodo-4,6-di-tert-amylphenol
4-iodo-2-tert-octylphenol
2,4-dichloro-6-tert-butyl-3-methylphenol
2,4-dichloro-6-tert-amylphenol
2,4-dichloro-6-tert-octylphenol The stabilizers may generally be obtained by halogenation of an alkyl phenol or by alkylation of a halophenol.

The following examples represent methods of preparing the stabilizers:

EXAMPLE I

*2-tert-octyl-4-chlorophenol*

To a mixture of 257 g. of p-chlorophenol and 336 g. of diisobutylene was added 50 grams of stannic chloride. The temperature was maintained at 60–65° C. for two hours. The resulting product was washed with dilute hydrochloric acid and then with 5 per cent sodium bicarbonate solution. It was dried and on distillation a liquid product was recovered having a boiling point of 130–135° C. at 2 mm. pressure.

EXAMPLE II

*2-chloro-4,6-di-tert-butyl-3-methylphenol*

One hundred ten grams of 4,6-di-tert-butyl-m-cresol was dissolved in 400 ml. of carbon tetrachloride and stirred at 0 to 5° C. while 39 grams of chlorine was bubbled into the solution. The solvent was distilled from the resulting reacted mixture and the product purified by fractionation. The trialkylated chlorophenol used in the following tests was recovered in the boiling range of 149 to 149.5° C. at 7.3 mm. pressure.

EXAMPLE III

*2,6-di-tert-butyl-4-chlorophenol*

A mixture of 128.4 grams of p-chlorophenol, 200 grams of tert-butyl chloride and 7.5 grams of stannic chloride was heated at 50° C. for several hours. Then 200 grams of tert-butyl chloride and 5 grams of boron trifluoride-ether complex were added, and the reaction mixture was heated to 60–70° C. for 4 hours. An additional 200 grams of tert-butyl chloride was added and the reaction was allowed to continue for 6 hours. The reaction mixture was cooled and then washed with water to remove the catalyst. The crude product was dried and then distilled. The purified product used as stabilizer was taken in the boiling range from 135° C. at 10 mm. pressure to 135° C. at 3 mm. pressure. The yield was 40 grams. After two recrystallizations from petroleum ether, this material had a melting point of 77 to 78° C..

Analysis.—Calculated for $C_{14}H_{21}OCl$: $Cl=14.73\%$. Found: $Cl=14.86\%$, $14.84\%$.

EXAMPLE IV

2-chloro-4,6-di-tert-amylphenol

There was dissolved 0.48 mole of 4,6-di-tert-amylphenol in about twice its weight of carbon tetrachloride. Then 37 grams of chlorine was slowly passed into this solution at 0-5° C. with stirring. The carbon tetrachloride was then distilled off, and the fraction distilling at 138° to 142° C. at 5 mm. was collected as 2-chloro-4,6-di-tert-amylphenol. This product weighed 81 grams.

EXAMPLE V

2,4-dichloro-6-tert-amylphenol

One hundred eighty-five grams of o-tert-amylphenol dissolved in 500 ml. of carbon tetrachloride was exhaustively chlorinated at about 50-60° C. The reaction mixture was allowed to stand overnight and was then heated to refluxing temperature and refluxed for three hours. The solution was washed with water and then three times with five per cent aqueous sodium bicarbonate. The carbon tetrachloride was distilled off, and the residue was fractionated. The product taken at 135-136° C. at 10 mm. weighed 156 grams. Analysis for chlorine gave $31.20\%$; calculated for $C_{11}H_{14}OCl_2$ $30.45\%$.

EXAMPLE VI

2,6-di-tert-butyl-4-chlorophenol

Ten grams of zinc chloride was added to 128.5 grams (1 mole) of p-chlorophenol and 232 grams (2.5 moles) of tert-butyl chloride. The reaction mixture was heated to refluxing temperature. Thereafter it was heated at 45-50° C. for four hours and then at 60-70° C. for four hours. An additional 23.2 grams of tert-butyl chloride was then added, and the mixture was heated at 70-90° C. for three hours and at 60-70° C. for twelve hours. The reaction mixture was then heated to 100° C. and kept at that temperature for 15 minutes, after which it was allowed to cool. The cooled reaction mixture was washed with water, 5 per cent aqueous sodium hydroxide, and then again with water. The crude produce was vacuum-distilled. The fraction (16.9 grams) distilling between 135° C. at 10 mm. and 132° C. at 4 mm. was taken as 2,6-di-tert-butyl-4-chlorophenol and used in the tests described below.

EXAMPLE VII

2-tert-octyl-4-chlorophenol and 2,6-di-tert-octyl-4-chlorophenol

To 128.5 grams (1 mole) of p-chlorophenol mixed with 336 grams (3 moles) of diisobutylene were slowly added 20 grams of boron fluoride-ether complex, the reaction temperature being maintained at 60-70° C. After the addition had been completed, the reaction mixture was heated at 65-70° C. for two hours. The reaction mixture was washed with water, 100 ml. of 10 per cent aqueous sodium hydroxide, and again with water. The crude product was dried over sodium carbonate and then vacuum-distilled. The fraction distilling at 146° C. at 5 mm. to 144° C. at 1 mm. pressure was taken as substantially 2-tert-octyl-4-chlorophenol, and the fraction distilling at 144° C. at 1 mm. to 196° C. at 1 mm. was taken as substantially 2,6-di-tert-octyl-4-chlorophenol.

The stabilizers used in the tests which follow were prepared as above, or in a similar manner.

Various tests were conducted on rubbery copolymers prepared by adding two per cent of each of several of the stabilizers to a latex resulting from emulsion copolymerization of styrene and 1,3-butadiene in the proportions required to obtain the rubbery copolymer known as GR-S. Each latex sample was then coagulated to obtain copolymer in which the stabilizer was dispersed.

In the first test the stabilizers used were those of Examples I, II and III. A blank containing no stabilizer was prepared as well as a control which contained two per cent of triphenyl phosphite. The various latices were coagulated in the usual way with dilute aqueous aluminum sulfate (low iron) and dried for 24 hours at 70° C. Samples of the dried and aged products were compared to determine the absolute and relative effectiveness of the different stabilizers. The tests included a comparison of the colors of the different materials to determine to what extent discoloration had taken place. The samples were also tested manually by feeling and stretching. The results of the tests are reported in Table 1.

TABLE 1

| Stabilizer | After Drying 24 Hours at 70° C. | | After Aging 2 Days at 110° C. | |
|---|---|---|---|---|
| | Color | Condition | Color | Condition |
| 2-tert-octyl-4-chlorophenol | Light gray | No deterioration | Brown | Slightly set up. |
| 2-chloro-4,6-di-tert-butyl-3-methylphenol | do | do | do | Somewhat set up. |
| 2,6-di-tert-butyl-4-chlorophenol | Light gray-brown | do | do | Slightly set up. |
| None (blank) | Light brown | do | do | Cured. |
| Triphenyl phosphite (control) | Light gray-brown | do | Light brown | Slightly hardened. |

The results recorded in Table 1 show the superiority of the stabilizers of this invention as compared both with the blank and the triphenyl phosphite control. The blank became brown and cured on aging. The control discolored somewhat and its physical condition after aging was much worse than that of rubbers stabilized with the stabilizers of this invention.

The test samples were vulcanized and the resulting vulcanized compositions were tested to determine the values of the various stabilizers. The butadiene-styrene copolymers were compounded according to the following formula:

FORMULA I

| | Parts by weight |
|---|---|
| Copolymer containing 2% stabilizer | 100.00 |
| Coumarone-indene resin | 7.00 |
| Sulfur | 4.00 |
| Wax | 2.00 |
| Magnesia | 5.00 |
| Zinc oxide | 110.00 |
| Titanium dioxide | 30.00 |
| Ultramarine blue | 0.20 |
| Accelerator | 2.00 |

The various compounded synthetic rubber compositions were cured for 20, 40 and 80 minutes at 298° F. Averages of the physical properties observed for the various cures are reported in Table 2.

TABLE 2

*Physical properties of cured GR-S*

| Stabilizer | Triphenyl phosphite (control) | 2-tert-octyl-4-chloro-phenol | 2-chloro-4,6-di-tert-butyl-3-methyl-phenol | 2,6-di-tert-butyl-4-chloro-phenol |
|---|---|---|---|---|
| 300% Modulus | 205 | 150 | 165 | 165 |
| Tensile | 800 | 980 | 725 | 970 |
| Elongation | 575 | 685 | 595 | 720 |

The modulus and tensile strengths are recorded in pounds per square inch and elongations are recorded in percentages. Samples of the above cured stocks were subjected to weathering. They were exposed 16 hours under a General Electric sun lamp. Each discolored but slightly to a light cream color. On ten months' exposure to Ohio weathering there was little change in color (less than in sun lamp test) in any of the stabilized samples, and each showed only slight checking. The stabilizers are therefore suitable for use in white sidewall tires and are superior in this respect to a "non-discoloring" commercial stabilizer, heptylated diphenylamine, which caused a similar cured stock to turn tan or light brown under the conditions of the foregoing two weathering tests.

Further tests were made on GR-S latex coagulum containing two per cent of each of several stabilizers of the invention. Table 3 records changes in color and properties that occurred during drying and aging of these test materials.

TABLE 3

*Tests on GR-S Copolymer*

| | After Drying 20 Hours at 75° C. | After Oven-Aging 4 Days at 90° C. |
|---|---|---|
| 2-chloro-4,6-dibutyl-3-methylphenol | Light gray; no deterioration | Light brown; no change. |
| 2,6-di-tert-butyl-4-chlorophenol | Light gray-brown; no deterioration. | Do. |
| 2-tert-octyl-4-chlorophenol | ----do---- | Do. |
| 2,6-di-tert-octyl-4-chlorophenol | ----do---- | Do. |
| 2-chloro-4,6-di-tert-amylphenol | Light gray; no detreioration. | Do. |
| None (blank) | Light brown; no deterioration. | Light brown; somewhat set up. |

Table 3 shows that good to excellent protection to the copolymer is given by the stabilizers of the invention.

Table 4 shows the effect of two per cent of several other stabilizers of the invention, in comparison with GR-S copolymer coagulum containing no stabilizer.

TABLE 4

*Tests on GR-S Copolymer*

| | After Drying 20 Hours at 75° C. | After Oven-Aging 4 Days at 90° C. |
|---|---|---|
| 2-tert-octyl-4-chlorophenol | Gray brown; no deterioration. | Gray brown; no deterioration. |
| 2,4-dichloro-6-tert-butyl-3-methylphenol | ----do---- | Do. |
| 2,6-di-tert-butyl-4-chlorophenol | Light gray brown; no deterioration. | Do. |
| 2,4-dichloro-6-tert-amylphenol | ----do---- | Gray brown; slightly set up. |
| None (blank) | ----do---- | Light gray brown; slightly set up, slightly resinous. |

Table 4 shows that the halo-alkylphenols of the invention impart to rubbery polymers of the GR-S type much greater resistance to deterioration than is possessed by the unstabilized polymers.

The stabilizers may be used in various vulcanizing formulations including those of a high content of white pigment suitable for white sidewall tires, etc. They may likewise be used in any known unvulcanized or vulcanized formulation, as desired. Although usually about one to three parts of stabilizer will be used per 100 parts of the copolymer, larger or small amounts may be employed within the general range of 0.5 to 10 per cent.

What is claimed is:

1. The method of stabilizing a rubbery copolymer of hydrocarbon conjugated-diene monomer and monovinyl aromatic monomer, which comprises adding a relatively small amount of a halo-alkylphenol to a latex of the copolymer and then drying the copolymer in the presence of the halo-alkylphenol, the halo-alkylphenol containing at least one alkyl substituent of four to eight carbon atoms, the total number of carbon atoms in the alkyl substituents being in the range of five to twenty, the halogen substituents not exceeding two and including one in a position, relative to the hydroxy radical, from the group consisting of ortho and para.

2. The method of protecting a rubbery copolymer of hydrocarbon conjugated-diene monomer and monovinyl aromatic monomer, which includes vulcanizing the copolymer containing admixed therewith a relatively small amount of a halo-alkylphenol of the formula

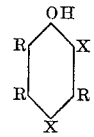

wherein R is one of the group consisting of hydrogen and alkyl radicals, X is one of the group consisting of hydrogen, halogen and alkyl radicals at least one X being halogen, at least one alkyl radical containing 4 to 8, inclusive, carbon atoms, and the total number of alkyl carbon atoms being in the range of 5 to 20, inclusive.

3. A stabilized rubbery composition containing a rubbery copolymer of 1,3-butadiene and styrene, and admixed therewith a relatively small amount of 2-tert-octyl-4-chlorophenol.

4. A stabilized rubbery composition containing a rubbery copolymer of 1,3-butadiene and styrene, and admixed therewith a relatively small amount of 2-chloro-4,6-di-tert-butyl-3-methylphenol.

5. A stabilized rubbery composition containing a rubbery copolymer of 1,3-butadiene and styrene, and admixed therewith a relatively small amount of 2,6-tert-butyl-4-chlorophenol.

6. A stabilized rubbery composition containing a rubbery copolymer of 1,3-butadiene and styrene, and admixed therewith a relatively small amount of 2,4-dichloro-6-tert-butyl-3-methylphenol.

7. A stabilized rubbery composition containing a rubbery copolymer of 1,3-butadiene and styrene, and admixed therewith a relatively small amount of 2,6-di-tert-octyl-4-chlorophenol.

8. A rubbery copolymer of hydrocarbon conjugated-diene monomer and monovinyl aromatic monomer which contains a small amount of a halo-alkylphenol containing at least one alkyl substituent of 4 to 8 carbon atoms, the total number of carbon atoms in the alkyl substituents being in the range of 5 to 20, the halogen substituents not exceeding 2 and including one in a position, relative to the hydroxy radical, from the group consisting of ortho and para.

9. A rubbery copolymer of hydrocarbon conjugated-diene monomer and monovinyl aromatic monomer which contains a small amount of a halo-alkylphenol of the formula

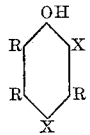

wherein R is one of the group consisting of hydrogen and alkyl radicals, X is one of the group consisting of hydrogen, halogen and alkyl radicals at least one X being halogen, at least one alkyl radical containing 4 to 8, inclusive, carbon atoms, and the total number of alkyl carbon atoms being in the range of 5 to 20, inclusive.

10. Vulcanizate of a rubbery copolymer of hydrocarbon conjugated-diene monomer and monovinyl aromatic monomer which includes a small amount of a halo-alkylphenol of the formula

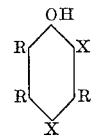

wherein R is one of the group consisting of hydrogen and alkyl radicals, X is one of the group consisting of hydrogen, halogen and alkyl radicals at least one X being halogen, at least one alkyl radical containing 4 to 8, inclusive, carbon atoms, and the total number of alkyl carbon atoms being in the range of 5 to 20, inclusive.

HARRY E. ALBERT.

REFERENCES CITED

The following references are of record in the file of this patent:

UNITED STATES PATENTS

| Number | Name | Date |
| --- | --- | --- |
| 1,987,228 | Brunson | Jan. 8, 1935 |
| 2,287,443 | Mills | June 23, 1942 |

FOREIGN PATENTS

| Number | Country | Date |
| --- | --- | --- |
| 598,322 | Great Britain | Feb. 16, 1948 |